United States Patent
Sugawara et al.

(10) Patent No.: US 8,974,603 B2
(45) Date of Patent: Mar. 10, 2015

(54) METHOD OF PURIFYING FILTER, AND METHOD OF CLEANING OR DRYING OBJECT TO BE TREATED

(75) Inventors: Hiroshi Sugawara, Tokyo (JP); Yoshinori Ono, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 14/000,361

(22) PCT Filed: Feb. 18, 2011

(86) PCT No.: PCT/JP2011/053498
§ 371 (c)(1),
(2), (4) Date: Aug. 19, 2013

(87) PCT Pub. No.: WO2012/111139
PCT Pub. Date: Aug. 23, 2012

(65) Prior Publication Data
US 2013/0319957 A1    Dec. 5, 2013

(51) Int. Cl.
*B08B 7/04*    (2006.01)
*B01D 29/62*    (2006.01)
*B01D 46/00*    (2006.01)
*B01D 65/02*    (2006.01)

(52) U.S. Cl.
CPC ............ *B01D 29/62* (2013.01); *B01D 46/0068* (2013.01); *B01D 65/02* (2013.01); *B01D 2321/18* (2013.01)
USPC .................. 134/10; 95/273; 95/281; 96/233; 96/372; 55/282; 55/301; 422/1; 210/791; 134/12; 134/34; 134/42

(58) Field of Classification Search
CPC .............. B08B 3/00; B08B 3/04; B08B 5/00; B08B 9/00; B01D 29/62
USPC ......... 95/273, 281; 96/233, 372; 55/282, 301; 422/1; 210/791; 134/10, 12, 34, 42
See application file for complete search history.

(56) References Cited

U.S. PATENT DOCUMENTS

| | | | | | |
|---|---|---|---|---|---|
| 4,717,406 | A | * | 1/1988 | Giacobbe | 62/642 |
| 4,972,677 | A | * | 11/1990 | Moriya et al. | 62/50.2 |
| 5,908,510 | A | * | 6/1999 | McCullough et al. | 134/2 |
| 6,457,480 | B1 | * | 10/2002 | Cotte et al. | 134/22.1 |
| 7,124,764 | B2 | * | 10/2006 | Kin et al. | 134/22.1 |
| 2005/0198971 | A1 | * | 9/2005 | Leitch et al. | 62/48.1 |

FOREIGN PATENT DOCUMENTS

| | | | |
|---|---|---|---|
| JP | 07-284739 A | | 10/1995 |
| JP | 10-050648 A | | 2/1998 |
| JP | 02001261320 A | * | 9/2001 |

(Continued)

*Primary Examiner* — Bibi Carrillo
(74) *Attorney, Agent, or Firm* — Knobbe Martens Olson & Bear LLP

(57) ABSTRACT

A filter that filters carbon dioxide in the gaseous, liquid or supercritical state is efficiently purified. The carbon dioxide is used to at least clean or dry an object to be treated, or to clean or dry the object to be treated. A method of purifying a filter for filtering carbon dioxide in a gaseous, liquid or supercritical state is provided. The carbon dioxide is used to at least clean or dry the object to be treated, or to clean and dry the object to be treated. According to the method, the filter 13 is purified before the carbon dioxide is filtered in the gaseous, liquid or supercritical state by the filter 13. The filter 13 is purified by allowing carbon dioxide to pass through the filter.

8 Claims, 3 Drawing Sheets

(56) References Cited

FOREIGN PATENT DOCUMENTS

| | | |
|---|---|---|
| JP | 2005-279472 A | 10/2005 |
| JP | 2005-279473 A | 10/2005 |
| JP | 2006-247600 A | 9/2006 |
| JP | 2008-066495 A | 3/2008 |
| JP | 2009-194092 A | 8/2009 |
| JP | 2011-045818 A | 3/2011 |

* cited by examiner

METHOD OF PURIFYING FILTER, AND METHOD OF CLEANING OR DRYING OBJECT TO BE TREATED

Cross-Reference to Related Applications

This application is the U.S. National Phase under 35 U.S.C. §371 of International Application PCT/JP2011/053498, filed Feb. 18, 2011. The disclosures of the above-described application are hereby incorporated by reference in their entirety. The International Application was published under PCT Article 21(2) in a language other than English.

TECHNICAL FIELD

The present invention relates to a method of purifying a filter and a method of cleaning or drying an electronic component, such as a semiconductor device, to which the method is applied, and particularly relates to a method of purifying a filter for filtering supercritical carbon dioxide that is used for a cleaning process etc. of electronic components.

BACKGROUND ART

Applications of supercritical carbon dioxide (critical point 31° C., 7.4 MPa) to the cleaning process of semiconductor devices, as well as MEMS (Micro Electro Mechanical Systems), have been studied (JP07-284739, JP10-50648). Supercritical carbon dioxide can be produced by making the temperature and the pressure of carbon dioxide higher than or equal to the critical point described above. Supercritical carbon dioxide has excellent penetrating and diffusing performance due to the intermediate characteristics between gas and liquid. Therefore, supercritical carbon dioxide easily penetrates into the micro recesses of a wafer in order to entrain and remove foreign objects. In particular, supercritical carbon dioxide easily penetrates into small recesses due to the feature in which there is no surface tension, thus achieving favorable cleaning performance even for a semiconductor device having reduced widths of recesses, which are caused by large-scale integration of the devices etc. Supercritical carbon dioxide is considered as a cleaning medium for the next generation owing to such characteristics.

Further, supercritical carbon dioxide that adheres to recesses can be easily vaporized by depressurizing the chamber that houses a wafer or the like. Studies have been made on using such characteristics and applying supercritical carbon dioxide to the drying process of a wafer and the like.

SUMMARY OF INVENTION

Problem to be Solved by the Invention

Supercritical carbon dioxide is useful for cleaning and drying a semiconductor device and the like, as described above. However, if fine particles are contained in supercritical carbon dioxide, then the fine particles may directly adhere to an object to be treated, then remain on the object and thus may directly affect the production yield. Therefore, there is a need to enhance the cleanliness level of supercritical carbon dioxide itself in order to increase the production yield.

In order to enhance the cleanliness level of supercritical carbon dioxide, it is preferable that supercritical carbon dioxide be filtered with a filter. The inventors of the present application studied using a sintered metal filter and a ceramics filter as the filter. These filters are used to filter nitrogen gas etc. that is used in the manufacturing process of electronic components, such as semiconductor devices. These filters have an infinite number of micropores formed thereon, which remove fine particles from the gas. Managing the cleanliness of the filters is carried out from the manufacturing stage, and the filters are cleaned, as needed, so that they are delivered as the semiconductor grade. Further, a sufficient level of quality control is performed through inspections and strict storage at each stage prior to delivery. Cleanliness control at a sufficient level is also performed in manufacturing plants of semiconductor devices etc. from the time of installing the filter into an apparatus to the start of use of the filter. In this manner, it is confirmed that highly clean gas is ensured immediately after the start of use.

Since supercritical carbon dioxide is manufactured by making the temperature and the pressure of carbon dioxide higher than or equal to the critical point, as described above, the state (phase) of the carbon dioxide at the time of passing through the filter may be changed depending on how the supercritical carbon dioxide is supplied and where the filter is provided. For example, in the case of manufacturing supercritical carbon dioxide from carbon dioxide in the gas phase as the material, carbon dioxide in the gas phase may be filtered, or alternatively, supercritical carbon dioxide may be filtered, depending on where the filter is provided. When carbon dioxide in the gas phase is liquefied first so that the carbon dioxide in the liquid phase is used as the material for manufacturing the supercritical carbon dioxide, carbon dioxide in the liquid phase may be filtered, or alternatively, supercritical carbon dioxide may be filtered.

The inventors of the present application had thought that the performance and behavior of the filter did not largely depend on the state (phase) of the carbon dioxide at the time of passing through the filter because carbon dioxide in the liquid phase, as well as carbon dioxide in the supercritical state, is made from carbon dioxide in the gas phase. Namely, the inventors of the present application had thought that, with the use of a conventional gas filter of the semiconductor grade, highly clean carbon dioxide would be obtained immediately after the start of use of the filter, regardless of the state (phase) of carbon dioxide. However, the phenomenon in which the objects to be treated were contaminated with fine particles was actually observed when a new (unused) filter was used to filter carbon dioxide in the liquid phase or in the supercritical state.

As described above, when a filter is used to enhance the cleanliness of carbon dioxide in the liquid phase or in the supercritical state, the phenomenon in which the objects to be treated are contaminated with fine particles are observed for new (unused) filters. The contamination results in a lower product yield, causing a large influence on the manufacturing process of semiconductor devices etc. Meanwhile, such a phenomenon is less likely to occur for the gas-phase carbon dioxide that is cleaned with a filter. However, this does not affect the fact that such a phenomenon has to be prevented to the extent possible.

Thus, it is an object of the present invention to provide a method of efficiently purifying a filter that filters carbon dioxide in the gaseous, liquid or supercritical state, the carbon dioxide being used to at least clean or dry an object to be treated, or to clean and dry an object to be treated. Further, it is another object of the present invention to provide a method of cleaning or drying an object to be treated by means of the above-mentioned method.

Solution to Solve the Problem

According to an aspect the present invention, a method of purifying a filter that filters carbon dioxide in a gaseous, liquid or supercritical state is provided. The carbon dioxide is used to at least clean or dry an object to be treated, or to clean and dry the object to be treated. The method includes purifying the filter before filtering the carbon dioxide in the gaseous, liquid or supercritical state with the filter. The filter is purified by allowing carbon dioxide to pass through the filter.

There is strict adherence to ensuring the cleanliness of filters, as described above, and in general, there is no problem in using a filter as is. However, the inventors of the present application found that fine particles that exist inside of a filter might be washed away or peeled off from the filter so that the particles are discharged to the outside of the filter together with the carbon dioxide when carbon dioxide in the gaseous, liquid or supercritical state passes through the filter. The generation of the fine particles may be due to several reasons. For example, a part of the material for the filter may remain as fine particles during the manufacturing process of the filter, or external particles may adhere to the filter due to the forces that attract particles (the Van der Waals force, static electricity and the like). This phenomenon tends to occur when carbon dioxide in the liquid or the supercritical state passes through the filter, but a similar phenomenon can occur when carbon dioxide in the gaseous state passes through the filter, although the degree is not the same.

Based on the analysis, the inventors of the present application thought of purifying a filter, prior to use thereof, by allowing carbon dioxide to pass through the filter. The performance of the filter may be gradually stabilized by operating, in advance, the cleaning apparatus or the like with the filter mounted thereon, as needed, but efficient purification is difficult due to various restrictions on the operation conditions. The present invention provides efficient purification because the filter itself is purified in advance, unlike the conventional concept. A considerable number of fine particles, which may cause contamination, are removed from the purified filter. Accordingly, it is possible to prevent an object to be treated from being contaminated with fine particles and to realize the desired level of filtering performance by using such a filter for the filtration of carbon dioxide in the gaseous, liquid or supercritical state.

According to another aspect of the present invention, a method of cleaning or drying an object to be treated is provided. The method includes: a filter-purifying step of purifying a filter by allowing carbon dioxide to pass through the filter; a filtering step of filtering carbon dioxide in a gaseous, liquid or supercritical state by means of the purified filter; and a step of performing at least carrying out at least cleaning or drying of an object to be treated, or cleaning and drying of the object to be treated. The step is performed by using carbon dioxide in a supercritical state that is obtained by pressurizing or heating filtered carbon dioxide in the gaseous or liquid state, by using carbon dioxide in a supercritical state that is obtained by pressurizing and heating filtered carbon dioxide in the gaseous or liquid state or by using filtered carbon dioxide in the supercritical state.

Effect of Invention

As described above, according to the present invention, it is possible to efficiently purify a filter that filters carbon dioxide in the gaseous, liquid or supercritical state, the carbon dioxide being used to at least clean or dry an object to be treated, or clean and dry an object to be treated. Further, according to the present invention, it is possible to clean or dry an object to be treated by means of the above-mentioned method.

REFERENCE NUMERALS

Figure 1:
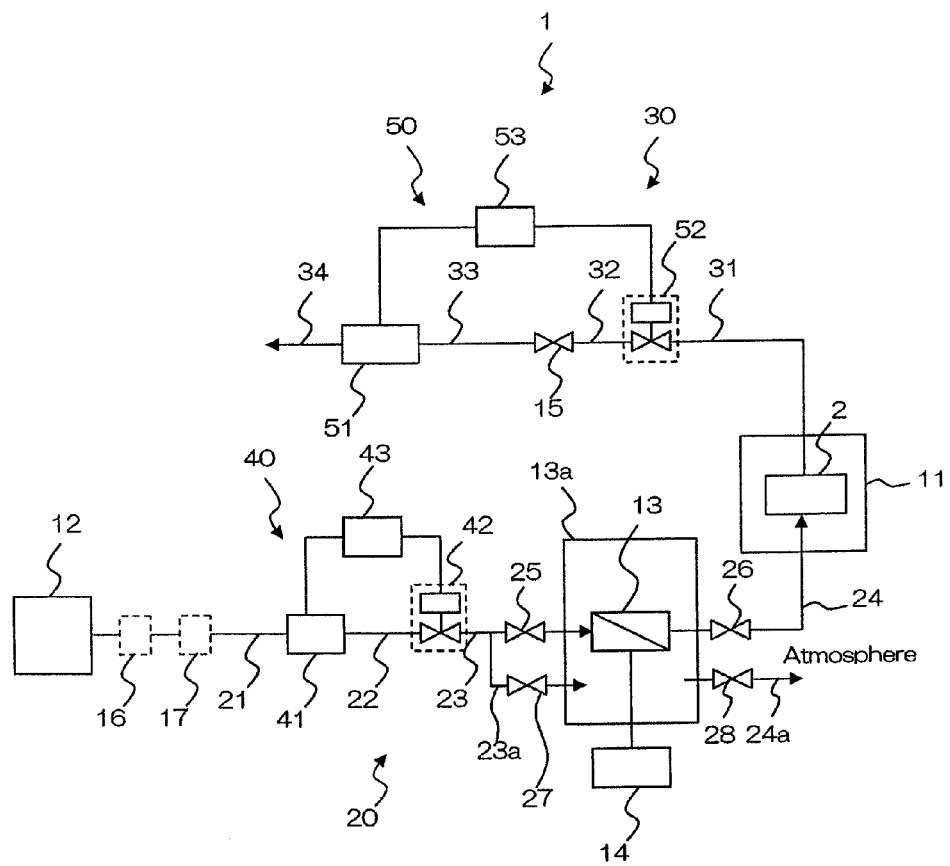
FIG. 1 is a schematic diagram showing the configuration of an apparatus for cleaning/drying an object to be treated to which the present invention is applied.

1 Treatment apparatus
2 Object to be treated
11 Pressure vessel
12 High-pressure $CO_2$ source
13 Filter
13a, 13b Filter vessel
14 Heating means
15 Pressure keeping valve
16 Pump
17 Heater
20 Supply line
30 Discharge line
40 Flow control means
50 Flow control means
61 Filter-purifying apparatus
62 $CO_2$ vessel
63 Condenser
64 Storage tank
65 Pump
66 Filter
68 Evaporator
69 Filter Description of Embodiments Hereinafter, embodiments of the present invention will be described with reference to the drawings. Description will be given first of the apparatus for cleaning/drying an object to be treated (hereinafter, called a treatment apparatus 1), to which the present invention is applied.

The treatment apparatus 1 includes a pressure vessel 11 that houses an object to be treated 2, a supply line 20 that supplies carbon dioxide to the pressure vessel 11 and a discharge line 30 that discharges the carbon dioxide present in the pressure vessel 11.

The supply line 20 is connected to high-pressure carbon dioxide source 12 (hereinafter, called a high-pressure $CO_2$ source 12), and includes: a filter 13; a heating means 14 that heats the filter 13; and a flow control means 40 that regulates the flow rate of the supplied high-pressure carbon dioxide. The flow control means 40 has a flow meter 41, a flow control valve 42 and a controller 43 that controls the flow control valve 42. The high-pressure $CO_2$ source 12 and the flow meter 41 are connected by a line 21. The flow meter 41 and the flow control valve 42 are connected by a line 22. The flow control valve 42 and the filter 13 are connected by a line 23. The filter 13 and the pressure vessel 11 are connected by a line 24.

The discharge line 30 includes a flow control means 50 and a pressure keeping valve 15. The flow control means 50 regulates the flow rate of the carbon dioxide at a time when the carbon dioxide is discharged from the pressure vessel 11. The flow control means 50 has a flow meter 51, a flow control valve 52 and a controller 53 that controls the flow control valve 52. The pressure vessel 11 and the flow control valve 52 are connected by a line 31. The flow control valve 52 and the pressure keeping valve 15 are connected by a line 32. The pressure keeping valve 15 and the flow meter 51 are connected by a line 33. The flow meter 51 is connected to a line 34 for releasing the carbon dioxide to the outside of the system.

The pressure vessel 11 holds and stores the object to be treated 2, such as a semiconductor wafer, inside thereof and can clean and/or dry the object to be treated 2 with supercritical carbon dioxide by using the carbon dioxide supplied to an inside of the pressure vessel 11. The pressure vessel 11 is composed of a stainless steel vessel with a pressure resistivity of 7.4 MPa (critical pressure of carbon dioxide) or more.

The high-pressure $CO_2$ source 12 is not especially limited as long as it can store high-pressure carbon dioxide. The high-pressure $CO_2$ source 12 may be conventional means, such as a high-pressure gas cylinder, a cryogenic vessel and a liquefied gas storage tank. When carbon dioxide in the gas phase or in the liquid phase is stored, at least a pump (pressurizing means) 16 that pressurizes the carbon dioxide to the critical pressure or more, and/or a heater (heating means) 17 that heats the carbon dioxide to the critical temperature or more may be provided on the supply line 20. Thereby, the carbon dioxide in the gas phase or in the liquid phase can be converted into the supercritical state, and the supercritical carbon dioxide can be supplied to the pressure vessel 11. It is also possible to store supercritical carbon dioxide in the high-pressure $CO_2$ source 12, to pressurize it by the pump 16, as needed, and to supply it to the pressure vessel 11. In the former case, carbon dioxide in the supercritical state is obtained by pressurizing or heating gaseous or liquid carbon dioxide and then by filtering the carbon dioxide with the filter 13. Alternatively, carbon dioxide in the supercritical state is obtained by pressurizing and heating gaseous or liquid carbon dioxide and then by filtering the carbon dioxide with the filter 13. The carbon dioxide obtained is used for cleaning or drying of the object to be treated 2. In the latter case, the carbon dioxide in the supercritical state is filtered and used, as is, for cleaning or drying of the object to be treated 2. The pump 16 and the heater 17 may be provided on a primary side (an inlet side or a downstream side) of the filter 13 or may be provided on a secondary side (an outlet side or an upstream side). As is obvious from the above descriptions, the cleaning or drying process is performed with the supercritical carbon dioxide by supplying carbon dioxide to the pressure vessel 11, but carbon dioxide can pass through the filter 13 in any of the gas phase, the liquid-phase and the supercritical states.

The filter 13 removes fine particles that are contained in the high-pressure carbon dioxide or that are generated in the supply line 20 (the primary side of the filter 13), enhancing the cleanliness level of the object to be treated 2 after the cleaning or drying process is carried out. The filter 13 may be a conventional filter that is used for filtering high-pressure carbon dioxide, such as a sintered metal filter and a ceramics filter. Examples of the filter 13 include GFT03W (trade name, manufactured by Nippon Seisen Co., Ltd., performance of removing particles in gas: 0.3 μm), GFD1N (trade name, manufactured by Nippon Seisen Co., Ltd., performance of removing particles in gas: 1 μm), UCS-MB-02VR-30HK filter (manufactured by PURERON JAPAN CO., LTD., performance of removing particles in gas: 0.01 μm) and so on. The filter 13 may be provided with thermally insulating means (not illustrated) in order to facilitate temperature regulation of the high-pressure carbon dioxide that passes through the filter 13 and to reduce energy consumption.

The heating means 14 heats a main body of the filter 13 or the primary side of the filter 13. Thereby, it is possible to enhance the efficiency to remove the fine particles, which are contained in the high-pressure carbon dioxide or which are generated in the supply line 20 (the primary side of the filter 13), and to easily maintain a high level of cleanliness of the object to be treated 2. The heating means 14 is not especially limited as long as it can heat the filter 13, and may be, for example, a double tube type heat exchanger, an electric furnace, an electric heater and the like. When the heating means 14 is directly mounted on the filter 13, the heating means 14 may be thermally insulated together with the filter 13 by means of the aforementioned thermally insulating means in order to facilitate temperature regulation of the high-pressure carbon dioxide that passes through the filter 13 and to reduce energy consumption.

In order to accurately control the temperature of the high-pressure carbon dioxide that passes through the filter 13, the filter 13 may be provided with a temperature measurement device (not illustrated). The temperature measurement device is not especially limited as long as it can measure the temperature of the high-pressure carbon dioxide that passes through the filter 13. The temperature measurement device may measure the internal or external temperature of the filter 13 or may directly measure the temperature of the high-pressure carbon dioxide that passes through the filter 13. Alternatively, the temperature measurement device may measure the internal or external temperature of a pipe near the filter 13 (line 23 or line 24). When the temperature measurement device is provided, the device is preferably covered with a heat insulating material in order to avoid the influence of the ambient temperature.

The filter 13 is housed in a filter vessel 13a, which is a pressure resistant vessel. A line 23a branches from the line 23 at an outside of the filter vessel 13a. The line 23 penetrates through the filter vessel 13a and connects to the filter 13. The Line 23a is not connected to the filter 13, but is open to an inside of the filter vessel 13a. A line 24a is also open to an inside of the filter vessel 13a, while the other end of the line 24a is configured to be openable to the atmosphere. The filter 13 is configured to be attachable to and detachable from the filter vessel 13a by means of proper members (not illustrated), such as joints, that are provided on the line 23 and the line 24 in the filter vessel 13a. Valves 25, 26, 27 and 28 are provided on the line 23, the line 24, the line 23a and the line 24a, respectively. The high-pressure carbon dioxide flows into the filter 13 through the line 23, flows out through the line 24 and is supplied to the pressure vessel 11. The high-pressure carbon dioxide also flows into the inside of the filter vessel 13a through the line 23a and flows out through the line 24a so that it can be released to the atmosphere.

Because of this configuration, the internal pressure of the filter 13 and the external pressure of the filter 13 (internal pressure of the filter vessel 13a) can be brought into equilibrium by properly regulating opening/closing and the degree of opening of the valves 25, 26, 27 and 28. As a result, the net internal pressure exerted on the filter 13 itself can be significantly reduced. Therefore, accidental breakage of the filter 13, caused by excessive internal pressure, can be easily prevented. Further, the filter 13 may easily meet the legal regulation because it does not have to be treated as a pressure vessel. Examples of such a legal regulation include the notification under the High Pressure Gas Safety Act in Japan. In the present embodiment, the filter 13 can be detached for purification, described later, without being restricted by the legal regulation because the High Pressure Gas Safety Act is not applied to the filter 13.

The flow control means 40 facilitates precise regulation of the flow rate of the high-pressure carbon dioxide that is supplied to the pressure vessel 11. The flow meter 41 of the flow control means 40 may preferably measure the mass flow rate of the high-pressure carbon dioxide in the liquid or the supercritical state. Such flow meter 41 includes, for example, a Coriolis type mass flow meter (MFM). The flow control valve 42 is not especially limited as long as it can regulate the flow rate in accordance with the measurement of the flow meter 41, but it is preferable to use a flow control valve that is as clean as possible. The controller 43 may be operated automatically or manually, but the flow control valve 42 may preferably be an automatic valve that can regulate the flow rate in association with the measurement of MFM.

The flow control means 50 facilitates precise regulation of the flow rate of the carbon dioxide that is discharged from the pressure vessel 11. The flow meter 51, the flow control valve 52 and the controller 53 of the flow control means 50 may be the same as the flow meter 41, the flow control valve 42 and the controller 43 of the flow control means 40, respectively.

The pressure keeping valve 15 is provided to keep the internal pressure of the pressure vessel 11. The pressure keeping valve 15 may be, for example, a conventional pressure keeping valve having a spring that mechanically keeps the pressure. The pressure keeping valve 15 is arranged between the flow meter 51 and the flow control valve 52, but may be arranged on a secondary side of the flow meter 51.

Descriptions will be given on the method of cleaning the object to be treated 2 by means of the treatment apparatus 1 of the present embodiment. In the following treatment, carbon dioxide in the gaseous, liquid or supercritical state is filtered by means of the filter 13 that is purified according to the method described later. The method of drying the object to be treated 2 will be omitted, but is basically the same as the cleaning method.

First, high-pressure carbon dioxide that is stored in the high-pressure $CO_2$ source 12 is supplied to the supply line 20. The high-pressure carbon dioxide is then pressurized by the pump 16 and heated by the heater 17, as needed, and is fed to the filter 13 while the flow rate is regulated by flow the control means 40.

The filter 13 is preferably heated by the heating means 14 so that the temperature thereof is kept at 30° C. or more, more preferably, at 50° C. or more. By heating the filter 13 to increase the temperature of the high-pressure carbon dioxide that passes through the filter 13, it is possible to enhance the fine particle removal performance of fine particles contained in the high-pressure carbon dioxide that passes through the filter 13 and to easily maintain a high level of cleanliness of the object to be treated 2. Meanwhile, if the temperature of the filter 13 is too high, then the thicknesses of the filter 13 and pipes near the filter 13 are increased in order to ensure heat resistivity. This causes an increase in the size of the treatment apparatus 1 and makes it difficult to ensure an airtight seal at the sections. Therefore, the temperature of the filter 13 is preferably set at 200° C. or less.

The high-pressure carbon dioxide is filtered with the filter 13 (filtering step) and is then supplied to the pressure vessel 11. The object to be treated 2 in the pressure vessel 11 is cleaned with the supercritical carbon dioxide by the supplied carbon dioxide. This step may be carried out at a state where the supply of the high-pressure carbon dioxide from the supply line 20 is stopped and the carbon dioxide is not discharged from the pressure vessel 11 (a batch process) or where the carbon dioxide is constantly supplied to the pressure vessel 11 (a continuous process).

Next, the carbon dioxide in the pressure vessel 11 is discharged via the discharge line 30 while the flow rate of the carbon dioxide is regulated by the flow control means 50. The pressure keeping valve 15 may be opened continuously or stepwise or may be opened at a step. When the pressure keeping valve 15 is opened, the degree of opening of the flow control valve 52 of the flow control means 50 is limited in advance so that the flow rate does not rise even in momentarily.

Figure 2:
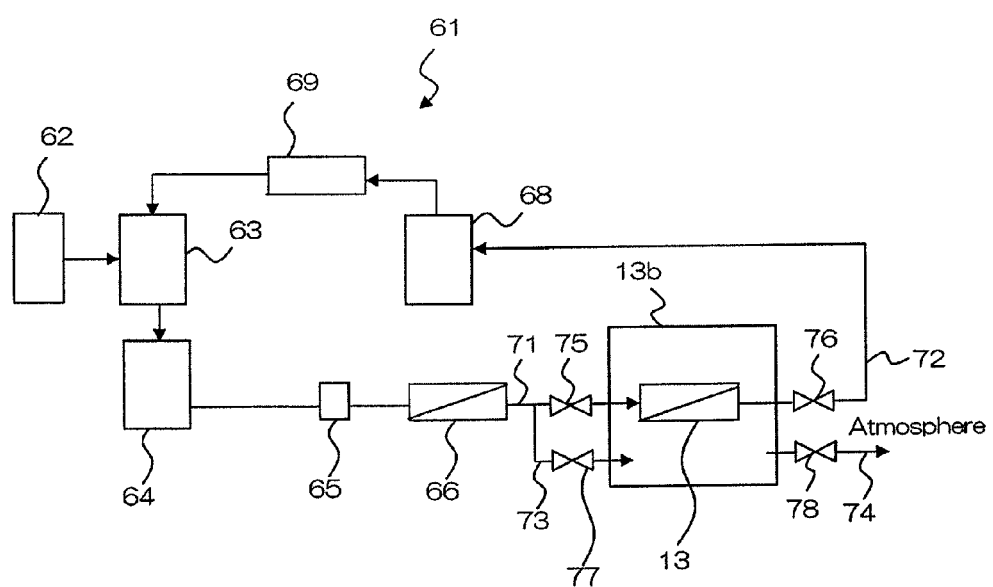
FIG. 2 is a schematic diagram showing the configuration of an apparatus for purifying a filter according to the present invention.

Next, an example will be given on the method of purifying the filter 13 (filter-purifying step) that is used for the treatment apparatus 1 described above. FIG. 2 schematically shows the configuration of a filter-purifying apparatus 61 used for purifying the filter 13. The filter 13 that is to be purified (the same as the filter 13 in FIG. 1) is housed inside of a filter vessel 13b. The use history of the filter 13 that is to be treated does not matter, but a significantly large effect is obtained for an unused filter or a new filter, as described in the example. The filter vessel 13b is a vessel similar to the filter vessel 13a in the treatment apparatus 1. The filter vessel 13b, similarly to the filter vessel 13a, connects to: lines 71 and 72 that are connected to the filter 13; a branch line 73 that branches from the line 71; and a line 74 that can be open to the atmosphere. Further, similarly to the filter vessel 13a, valves 75 to 78 are provided on the lines 71 to 74. Accordingly, the internal pressure of the filter 13 and the external pressure of the filter 13 (internal pressure of the filter vessel 13b) can be brought into equilibrium by regulating opening/closing and the degree of opening of the valves 75 to 78. As in the case of the filter vessel 13a, the filter 13 is connected to the lines 71 and 72 by proper means, such as joints, so that the filter 13 can be attached to and detached from the filter vessel 13b. Such a configuration prevents accidental failures of the filter 13 and, in addition, may easily meet the legal regulation.

A $CO_2$ vessel 62 stores high-pressure carbon dioxide in the gas phase or in the liquid phase. Carbon dioxide is supplied from the $CO_2$ vessel 62, as needed. The carbon dioxide is first changed into the liquid phase in a condenser 63 together with the recirculating carbon dioxide in the gas phase and is then stored in a storage tank 64. The carbon dioxide in the liquid phase that is stored in the storage tank 64 is pressurized by means of a pump 65, is filtered by a filter 66, flows into the filter 13 housed inside of the filter vessel 13b, flows through the filter 13 and is discharged to the outside of the filter 13. In this process, the carbon dioxide washes away the fine particles present in the inside of the filter 13 and discharges them to the outside of the filter 13. The carbon dioxide that is discharged from the filter 13 is vaporized in an evaporator 68, is then filtered with a filter 69 and joins, at the condenser 63, the carbon dioxide that is supplied from the $CO_2$ vessel 62 as needed. Either one or both of the filter 66 and the filter 69 may be omitted in certain embodiments.

The carbon dioxide that passes through the filter 13 may be in any of the gas phase state, the liquid state and the supercritical state, but carbon dioxide in the liquid or the supercritical state is desirable. The carbon dioxide in the liquid or the supercritical state has a higher density than the carbon dioxide in the gas phase and can more effectively purify the filter because high density carbon dioxide is better able to entrain fine particles so that the fine particles in the filter are discharged in an effective manner. In particular, the carbon dioxide in the supercritical state, which has no surface tension and which has a high diffusibility, spreads into every corner of the micropores and enhances the purifying effect, regardless of how fine and complicated the micropores of the filter 13 are. In order to make carbon dioxide in the supercritical state, carbon dioxide is pressurized to 7.4 MPa (critical pressure of carbon dioxide) or more by means of the pump 65 and heated to 31° C. (critical temperature of carbon dioxide) or more by means of a heater, not illustrated.

The carbon dioxide that passes through the filter 13 preferably has a high pressure, more specifically, a pressure of 1 MPa or more. Due to the high density, the carbon dioxide of 1 MPa or more effectively washes away the fine particles that adhere to the filter 13 and enhances the filter-purifying effect. Further, carbon dioxide having a high pressure generates a high differential pressure (ΔP) between upstream and downstream of the filter 13. Since the differential pressure is proportional to the flow rate, a higher differential pressure allows the carbon dioxide to pass at a higher flow rate, thereby enhancing the purifying efficiency. Further, since a higher flow rate leads to an increase in velocity of the flowing carbon dioxide and thereby enables treatment at a high velocity, it is possible to remove the fine particles that adhere to the filter 13 in an efficient manner. The carbon dioxide that flows at a high flow rate and a high velocity also shortens time for purification.

In the present embodiment, the total amount of the carbon dioxide that passes through the filter 13 recirculates and passes through the filter 13 again. Only a part of the carbon dioxide that passes through the filter 13 may recirculate. By recycling the carbon dioxide, reduction in purification cost, as well as the environmental effect obtained by limiting the amount of carbon dioxide released to the outside of the apparatus, can be expected.

When carbon dioxide recirculates, the effect of removing fine particles is further enhanced by filtering the recirculating carbon dioxide with the filter 69. All of the recirculating carbon dioxide or a part of the recirculating carbon dioxide may be filtered with the filter 69.

The carbon dioxide that passes through the filter 13 is vaporized by the evaporator 68 before the recirculating carbon dioxide is filtered with the filter 69. In general, a filter shows a better particle removal performance when filtering gas than when filtering substances in the liquid or the supercritical state. Therefore, the cleanliness level of carbon dioxide becomes even higher when the recirculating carbon dioxide is filtered in the gas phase, and accordingly the effect of purifying the filter 13 is enhanced. Thus, when the carbon dioxide that passes through the filter 13 is in the liquid or the supercritical state, it is preferable to vaporize the carbon dioxide first in the evaporator 68 and then to filter the carbon dioxide with the filter 69. All or a part of the recirculating carbon dioxide may be vaporized. Further, the evaporator 68 reduces the load on the filter 69 because the evaporator 68 can capture fine particles in the liquid phase and because only a limited amount of the fine particles move from liquid to gas. It is also possible to discharge the fine particles to the outside of the apparatus by discharging the liquid carbon dioxide that contains the fine particles. A cooler that promotes liquefaction of the carbon dioxide may be provided downstream of the evaporator 68. The carbon dioxide is more reliably liquefied when a cooler is used to cool the carbon dioxide. A gas-liquid interface can be formed in the evaporator 68 by supplying liquefied carbon dioxide to the evaporator 68, and the carbon dioxide can be quietly evaporated from the interface.

In the filter-purifying step, it is preferable to allow carbon dioxide to flow at a higher flow rate than the flow rate (actual volume flow rate at the temperature and pressure in the cleaning process) in the filtering step. In general, a flow having a higher flow rate has a higher flow velocity and more easily removes fine particles that adhere to the filter. In particular, the fine particles are less likely to be released from the filter in the filtering step, in which flow rate is lower than the flow rate in the filter-purifying step, by allowing carbon dioxide to flow at a higher volume flow rate than the volume flow rate in the filtering step and thereby removing fine particles.

In the filter-purifying step, it is preferable to allow carbon dioxide to flow at a higher temperature than the temperature in the filtering step because substances are generally eluted from a filter with a higher eluting velocity at a higher temperature and therefore the efficiency to remove the eluted substances is enhanced. In addition, eluted substances are less likely to be released from the filter in the filtering step, in which the temperature is lower than the temperature in the filter-purifying step, by allowing carbon dioxide to flow at a higher temperature than the temperature in the filtering step. Carbon dioxide having a higher density has a higher cleaning effect, as described above, but carbon dioxide has a lower density at a higher temperature under the same pressure. Taking this fact into consideration, it can be said that there are disadvantageous aspects in allowing high-temperature carbon dioxide to flow. However, it is possible to supply carbon dioxide having a high density by keeping carbon dioxide at a high pressure, as described above.

As described above, according to the present embodiment, fine particles that adhere to a filter, as well as a small amount of substances eluted from the filter itself, can be limited and a filter can be obtained with a significantly improved cleanliness level as compared with conventional art. Therefore, it is possible to obtain, immediately after the start of use, sufficiently cleaned carbon dioxide in the gaseous, liquid or supercritical phase and immediately to produce products, such as semiconductor devices, with a high yield.

Example

Figure 3A:
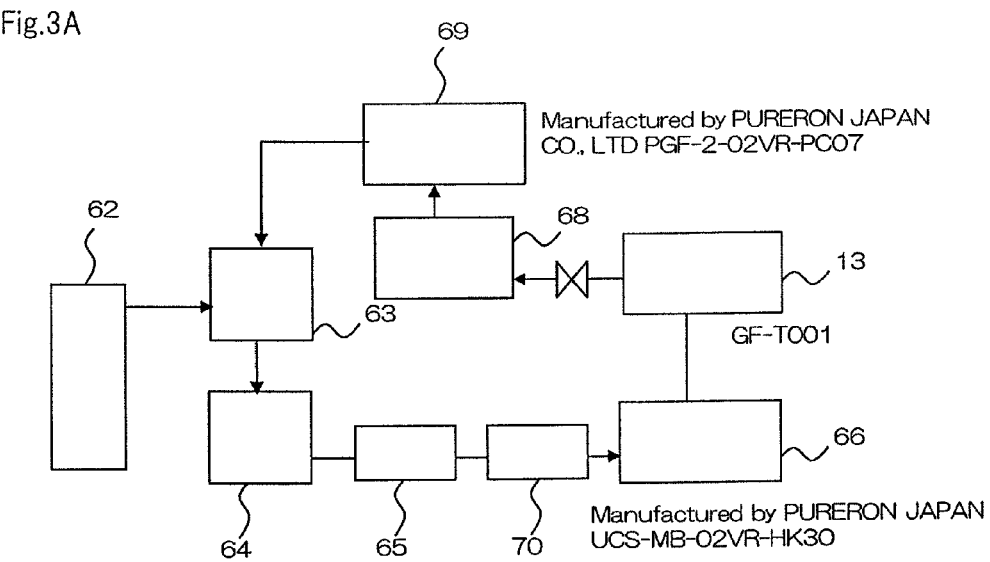
FIG. 3A is a schematic diagram showing the configuration of an apparatus used in the Example.

A new filter (NAS clean GF-T001) manufactured by Nippon Seisen Co. Ltd. was prepared and installed in the apparatus shown in FIG. 3A. A purification process with supercritical carbon dioxide was then performed. The apparatus used was substantially the same as the apparatus shown in FIG. 2, but a heater 70 was provided between the pump 65 and the filter 66. A high-pressure cylinder was used for the $CO_2$ vessel 62. Carbon dioxide was introduced at 20 MPa, 40° C. and 3 kg-$CO_2$/h, and the purification process was performed for 6 hours. In addition, a filter that had the same configuration but that had not been purified was prepared as a comparative example.

Figure 3B:
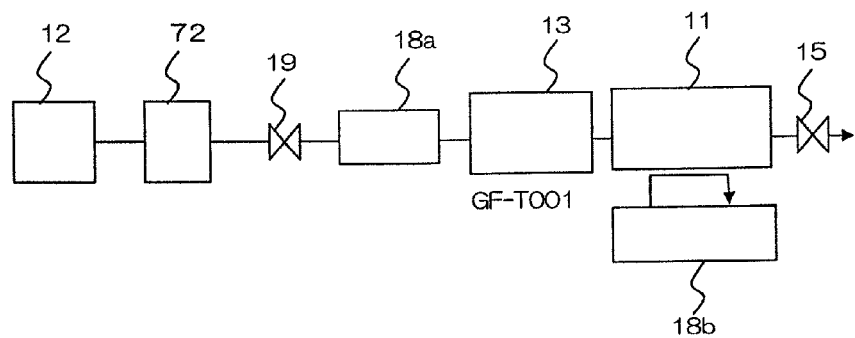
FIG. 3B is a schematic diagram showing the configuration of an apparatus used in the Example.

Next, as shown in FIG. 3B, carbon dioxide that was treated with purified the filter 13 was introduced at a mass flow rate of 20 g-$CO_2$/min into the pressure vessel 11, where a clean silicon wafer of about 15 cm (6 inches) was arranged. Fine particles with particle sizes of 0.5 µm or more was counted on the wafer. The number of the fine particles on the wafer used in the example was zero, while the number on the wafer used in the comparative example was three. Both examples showed a high degree of cleanliness that did not affect the experimental results. The supply line was heated with an electric heater 18a so that the external temperature was 40° C. The pressure vessel 11 was heated by means of a hot-water heater 18b with hot water temperature set at 60° C. Carbon dioxide was introduced in this state and supercritical carbon dioxide with a pressure of 10 MPa and a temperature of 50 to 55° C. was obtained. Immediately after the inside of the pressure vessel 11 reached this pressure/temperature, the pressure vessel 11 was depressurized to the atmospheric pressure and the wafer was removed. The depressurization process was conducted by fully closing a flow control valve 19 on the primary side and thereafter by opening the pressure-keeping valve 15 slowly so that the temperature in the pressure vessel 11 did not reach 40° C. or less. The wafer was stored in a clean case, and several days later, fine particles with particle sizes of 0.5 μm or more were counted on the wafer by means of a dust detection apparatus (WM-3, manufactured by TOPCON CORPORATION). The measurement was not conducted on the region having a 10 mm width along the outer periphery of the wafer. A similar test was carried out using the filter of the comparative example.

Table 1 shows the numbers of the fine particles on the wafers after the wafers were treated under the conditions described above. After the completion of the cleaning process with the carbon dioxide, the number of fine particles on the wafer was reduced due to the purification of the filter. In particular, most of the fine particles with particle sizes of more than 1 μm were removed. The inventors estimate that this is because larger fine particles are generally more easily removed. It is expected that, by extending the purification time, the cleanliness level of the filter can be further enhanced and that finer particles that are smaller in size can be prevented from adhering to the wafer.

TABLE 1

| Particle sizes | 0.5-1 μm | >=1 μm | >=0.5 μm |
|---|---|---|---|
| After purified (Example) | 400 | 1 | 401 |
| New (Comparative Example) | 422 | 171 | 593 |

What is claimed is:

1. A method of cleaning or drying an object to be treated, the method comprising:
   a step of purifying a filter, the step including mounting a filter in a first apparatus and allowing carbon dioxide to pass through the filter that is mounted in the first apparatus;
   a step of removing the filter from the first apparatus after the step of purifying the filter;
   a step of mounting the purified filter in a second apparatus after the filter is removed from the first apparatus;
   a filtration step that includes allowing carbon dioxide to pass through the purified filter after the purified filter is mounted in the second apparatus, said carbon dioxide being used for cleaning or drying an object to be treated; and
   a step of supplying the carbon dioxide to the object to be treated, wherein the carbon dioxide has passed through the purified filter in the filtration step.

2. The method of cleaning or drying an object to be treated according to claim 1,
   wherein the filter that is mounted in the first apparatus is an unused filter.

3. The method of cleaning or drying an object to be treated according to claim 1,
   wherein the carbon dioxide that passes through the filter that is mounted in the first apparatus is in a liquid or a supercritical state.

4. The method of cleaning or drying an object to be treated according to claim 1, wherein
   the step of purifying the filter further includes allowing at least a part of the carbon dioxide that has passed through the filter to pass through the filter, mounted on the first apparatus, again or allowing a part of the carbon dioxide that has passed through the filter, mounted on the first apparatus, to be released outside of the first apparatus .

5. The method of cleaning or drying an object to be treated according to claim 1, wherein
   the step of purifying the filter further includes allowing at least a part of the carbon dioxide that has passed through the filter, mounted on the first apparatus, to pass through a second filter that is different from the filter and then allowing the at least a part of the carbon dioxide to pass through the filter again.

6. The method of cleaning or drying an object to be treated according to claim 1, the method comprising:
   vaporizing at least a part of the carbon dioxide that has passed through the filter, mounted on the first apparatus, by means of an evaporator and allowing the at least a part of the carbon dioxide to pass through a second filter that is different from the filter and then allowing the at least a part of the carbon dioxide to pass through the filter again.

7. The method of cleaning or drying an object to be treated according to claim 1,
   wherein a volume flow rate of the carbon dioxide that passes through the filter mounted in the first apparatus is larger than a volume flow rate of the carbon dioxide that passes through the filter in the second apparatus.

8. The method of cleaning or drying an object to be treated according to claim 1,
   wherein a temperature of the carbon dioxide that passes through the filter mounted in the first apparatus is higher than a temperature of the carbon dioxide that passes through the filter mounted in the second apparatus.

* * * * *